United States Patent
Chen

(10) Patent No.: US 6,872,117 B1
(45) Date of Patent: Mar. 29, 2005

(54) BOTTOM BASE FOR A SOFT WATER-SPOUTING TOY

(75) Inventor: Ming-Chang Chen, Tainan Hsien (TW)

(73) Assignee: Co-union Industry Co., Ltd., Tainan Hsien (TW)

( * ) Notice: Subject to any disclaimer, the term of this patent is extended or adjusted under 35 U.S.C. 154(b) by 0 days.

(21) Appl. No.: 10/898,239

(22) Filed: Jul. 26, 2004

(51) Int. Cl.[7] ............................................. A63H 23/00
(52) U.S. Cl. ..................... 446/153; 280/288.4; 403/348; 248/228.5
(58) Field of Search .......................... 248/228.5, 230.1, 248/230.5, 231.61, 288.31; 446/153, 15–21, 404; 280/288.4, 828, 1.14; 239/289; 403/348–350, 353

(56) References Cited

U.S. PATENT DOCUMENTS

| | | | | |
|---|---|---|---|---|
| 3,677,446 A | * | 7/1972 | Guyer et al. ................ 446/404 |
| 5,211,075 A | * | 5/1993 | Martin-Rossman ......... 446/227 |
| 5,348,507 A | * | 9/1994 | McGhie et al. .............. 446/16 |
| 5,366,402 A | * | 11/1994 | Rudell et al. ................ 446/16 |
| 5,495,876 A | * | 3/1996 | Schramm ..................... 446/20 |
| 5,833,189 A | * | 11/1998 | Rossman et al. ...... 248/231.61 |
| 6,196,474 B1 | * | 3/2001 | Hillerson ................. 280/288.4 |
| 2004/0173721 A1 | * | 9/2004 | Kahan ........................ 248/314 |

* cited by examiner

Primary Examiner—Derris H. Banks
Assistant Examiner—Urszula M Cegielnik
(74) Attorney, Agent, or Firm—Bacon & Thomas PLLC

(57) ABSTRACT

A bottom base for a soft water-spouting toy includes an upper combining base and a lower fixing base threadably combined with each other. The fixing base is fixed stably on a handle or a child's bicycle, and the combining base is combined tightly with the lower portion of a soft water-spouting toy. The combining base has a center hole for a ball to sink therein, invertible with the toy for pouring water therethrough and into the interior of the toy after disengaged from the fixing base. After water is filled full in the toy, then the combining base with the toy is inverted again, threadably combined with the lower fixing base, letting the toy on the bicycle playable by a child riding on. The water in the toy and the bottom base cannot leak out by sealing means in the combining base and the fixing base.

4 Claims, 5 Drawing Sheets

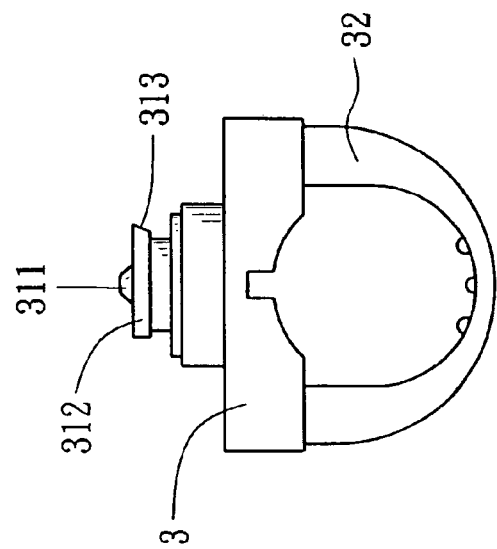
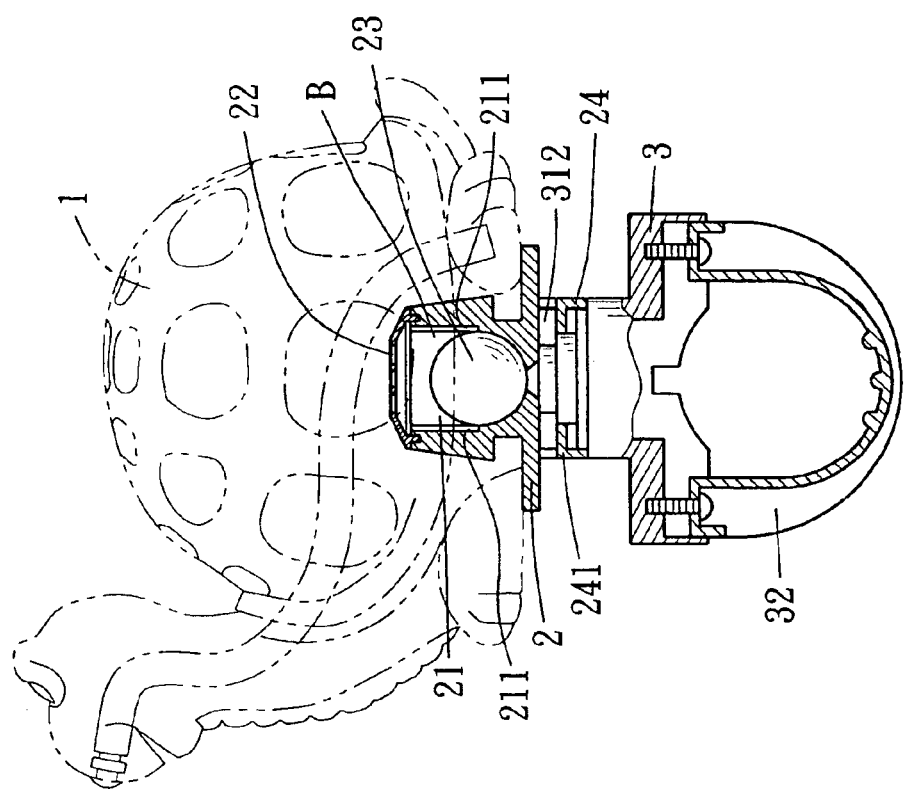
FIG. 5
FIG. 6

BOTTOM BASE FOR A SOFT WATER-SPOUTING TOY

BACKGROUND OF THE INVENTION

1. Field of the Invention

This invention relates to a bottom base for a soft water spouting toy, particularly to one possible to be attached with a child's bicycle or tricycle.

2. Description of the Prior Art

As this bottom base is used for fixing a soft water spouting toy on a handle of a child bicycle or tricycle that is a new developed toy, so there is no prior art to be described there.

SUMMARY OF THE INVENTION

This invention has been devised to offer a bottom base for a soft water-spouting toy to be fixed on a child's bicycle or tricycle so as to be played by a child to add more entertainment for spouting water when riding a bicycle or tricycle.

The feature of the invention is provision of a base consisting of an upper combining base and a lower fixing base threadably combined with the upper combining base. The combining base is to be tightly combined with a soft water-spouting toy, and the fixing base is to be fixed stably on a handle of a bicycle or tricycle.

The combining base is provided with a lengthwise center hole and a its lower end portion becoming a semicircle with a small hole, and a grid cap closes up an open end of the lengthwise center hole. A sinkable ball is placed in the lengthwise hole sinking down to block up the small hole. The upper combining base and the lower fixing base are threadably combined with engagement of male threads and female threads.

In order to fill water in the soft water-spouting toy, the upper combining base combined with the water-spouting toy is disengaged from the lower fixing base fixed on the handle of a bicycle or tricycle and then inverted upside down, with the ball in the lengthwise center hole falling down on the grid cap. Then water can be poured through the grid cap, the lengthwise center hole, and then in the interior of the water-spouting toy. After the interior of the toy and the base are filled full with water, the upper combining base together with the toy is once again turned upside town and threadably combined with the lower fixing base again, with the ball blocking the lower small hole to prevent the water inside from leaking out.

The assembling and disassembling of the upper combining base and the lower fixing base is effected by a female connecting member provided with the upper combining base and a male connecting member provided with the lower fixing base.

Further, a frustum is provided on top of the male connecting member of the fixing base to closely contact the small hole of the lengthwise hole for assisting prevention of water leakage from the small hole.

BRIEF DESCRIPTION OF DRAWINGS

This invention will be better understood by referring to the accompanying drawings, wherein:

FIG. 5 is an inverted cross-sectional view of the second embodiment of a bottom base for a soft water-spouting toy in the present invention;

FIG. 6 is a side view of a fixing base of the first embodiment in the present invention; and, FIG. 7 is an inverted cross-sectional view of a combining base of the second embodiment in the present invention.

DETAILED DESCRIPTION OF THE PRFERRED EMBODIMENTS

Figure 1:
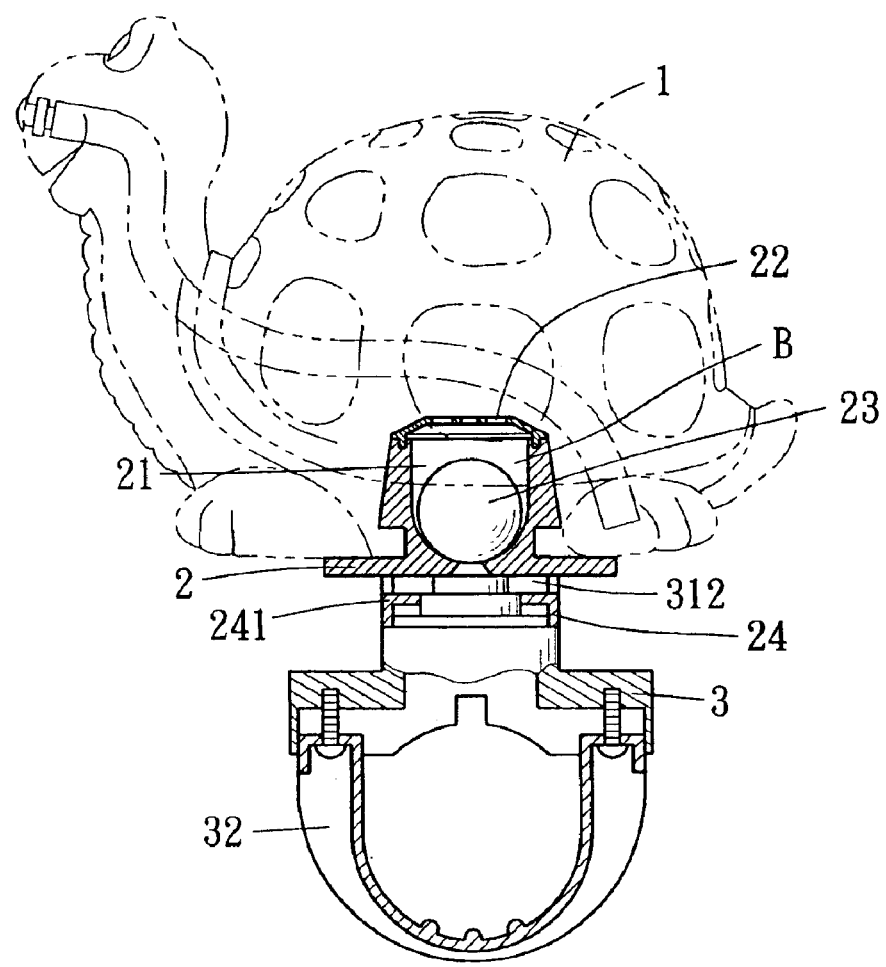
FIG. 1 is a cross-sectional view of the first embodiment of a bottom base for a soft water-spouting toy in the present invention.
Figure 2:
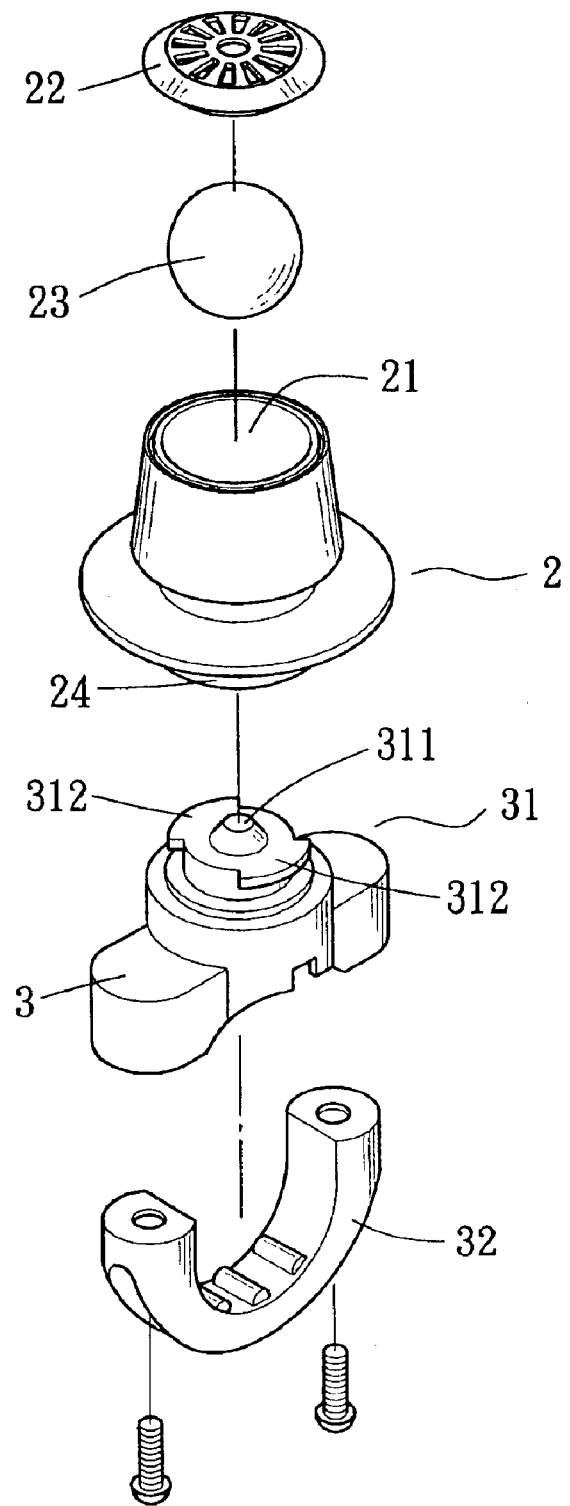
FIG. 2 is an exploded perspective view of the first embodiment of a bottom base for a soft water-spouting toy in the present invention.

A first embodiment of a bottom base for a soft water-spouting toy 1 in the present invention, as shown in FIGS. 1 and 2, includes an upper combining base 2, and a lower fixing base 3 as main components.

Figure 3:
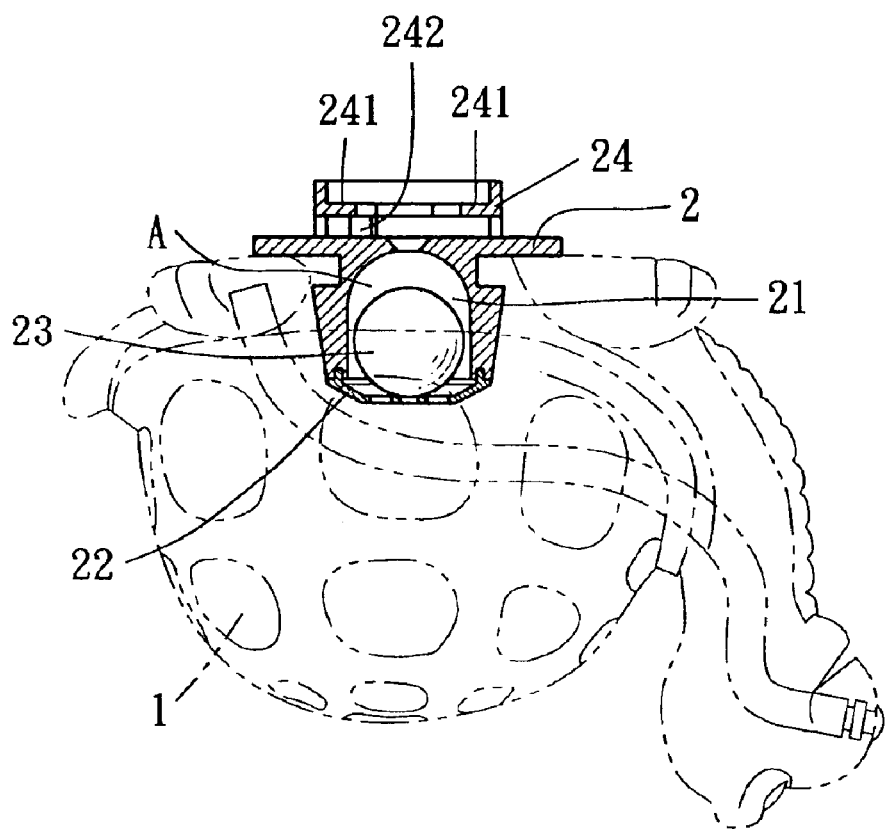
FIG. 3 is an inverted cross-sectional view of a combining base of the first embodiment in the present invention.
Figure 4:
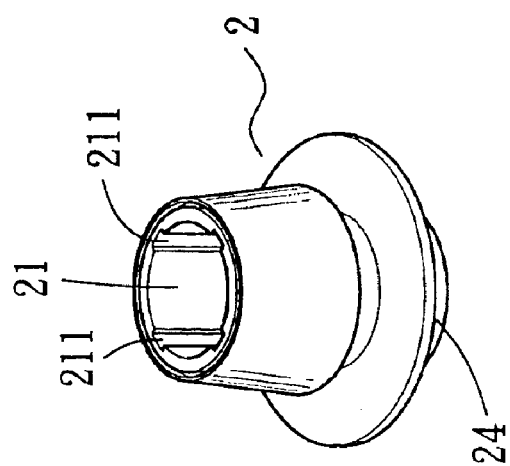
FIG. 4 is a perspective view of the combining base of a second embodiment of a bottom base for a soft water-spouting toy in the present invention.

The upper combining base 2 is provided with a lengthwise center hole 21 in the center of its upper surface, with its lower end (A) curved as a semicircle to have a small hole as shown in FIG. 3, a grid cap 22 closed up an upper end (B), and a ball 23 sinking down in the hole 21. The lengthwise center hole 21 is defined by an annular wall, which is provided with a plurality of lengthwise grooves 211 spaced apart equidistantly for enabling water to flow more quickly in the center hole 21, as shown in FIGS. 4 and 5. Further, the upper combining base 2 has a female connecting member 24 formed in a lower portion, and an annular flat rail 241 extending inward from its inner surface as shown in FIG. 3, and a terminal point 242 formed at the end of the flat rail 241.

The lower fixing base 3 is provided with a male connecting member 31 formed in an upper portion, a frustum 311 fixed on the center of an upper surface of the male connecting member 31, a flat disc 312 formed under the frustum 311 and having an inclined vertical side 313, as shown in FIG. 6. Further the combining base 3 has a U-shaped fixer 32 threadably fixed under the fixing base 3.

Next, the upper combining base 2 and the lower fixing base 3 are threadably combined with each other by engaging of the female connecting member 24 with the male connecting member 31. The inclined vertical face 313 of the flat disc 312 can guide the same disc 312 to glide smoothly along the upper side of the annular flat rail 241 and to be stopped by the terminal point 242 in the combined condition. At the same time, the frustum 311 forcefully pushes up against the lower mouth of the hole 21 of the combining base 2 to assist to prevent water from leaking out.

Figure 7:
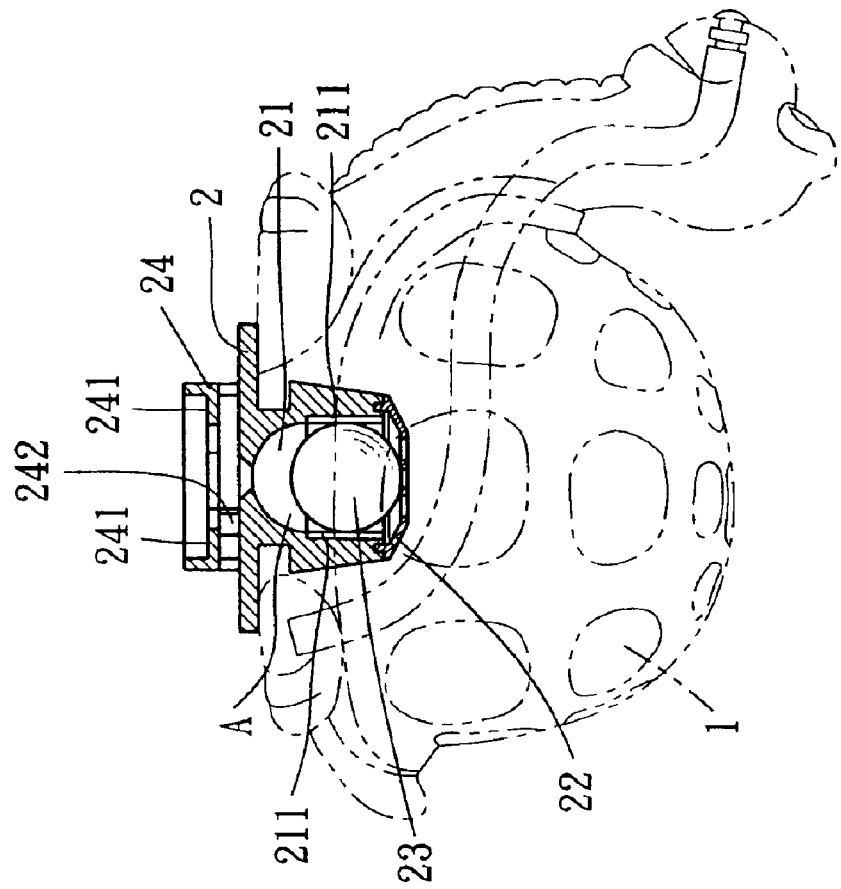

In order to fill water in the soft water-spouting toy 1, as shown in FIGS. 3 and 7, the soft water-spouting toy together with the upper combining base 2 threadably disengaged from the lower fixing base is first inverted upside down, then water can be poured in the center hole 21 through the female connecting member 24, with the ball 23 sinking on the upper end (B) of the center hole 21, never interfering with water flowing. After water is poured to fill up the interior of the soft water-spouting toy 1 and the bottom base, then the inverted toy with the bottom base is once again turned again upside down, letting the ball 23 fall down to the lower end (A) of the center hole 21, blocking the water therein from leaking out.

While the preferred embodiments of the invention have been described above, and it will be recognized and understood the various modifications may be made therein and the appended claims are intended to cover all such modifications that may fall within the spirit and scope of the invention.

What is claimed is:

1. A bottom base for a soft water-spouting toy comprising an upper combining base and a lower fixing base:

Said lower fixing base to be fixed stably on a handle of a child's bicycle or tricycle having an upper male connecting member: and, Said upper combining base having a female connecting member formed in a lower portion and a lengthwise center hole formed in the center of an upper surface and having its lower end portion becoming a semicircle with a small hole, an upper grid cap closing up an upper open end, a sinkable ball placed in said lengthwise center hole, said upper combining base threadably engaging with or disengaging from said lower fixing base by engagement or disengagement of said male connecting member of said lower fixing base with or from said female connecting member of said upper connecting base.

2. The bottom base for a soft water-spouting toy as claimed in claim 1, wherein said lengthwise center hole of said upper combining base is defined by an annular wall, which is provided with a plurality of lengthwise grooves spaced apart equidistantly.

3. The bottom base for a soft water-spouting toy as claimed in claim 1, wherein said lower fixing base further has a frustum on the center of an upper surface of said male connecting member, and said frustum forcefully closes up the small hole of a lower end of said lengthwise center hole after said upper combining base is threadably combined with said fixing base.

4. The bottom base for a soft water-spouting toy as claimed in claim 2, wherein said lower fixing base further has a frustum on the center of an upper surface of said male connecting member, and said frustum forcefully closes up the small hole of a lower end of said lengthwise center hole after said upper combining base is threadably combined with said fixing base.

* * * * *